UNITED STATES PATENT OFFICE.

CLARENCE W. EASTMAN, OF GREAT FALLS, MONTANA.

COMPOSITION AND PROCESS FOR TREATING PLANTS.

1,194,608. Specification of Letters Patent. Patented Aug. 15, 1916.

No Drawing. Application filed November 27, 1915. Serial No. 63,880.

*To all whom it may concern:*

Be it known that I, CLARENCE W. EASTMAN, of Great Falls, Montana, having invented certain new and useful Improvements in Compositions and Processes for Treating Plants, do hereby declare that the following is a full, clear, and exact description of the same.

Growing plants have been treated with various compositions and for various purposes. Thus it has been common practice, to spray plants with compositions which contain agents suitable for destroying insects, fungi, and other destructive agencies. It is also common to spray plants with compositions containing agents capable of destroying the life of the plant itself, and it has been proposed to spray plants with compositions containing agents serving to make the plants grow more rapidly. Of the various compositions used for these purposes, those containing water-soluble agents and water-insoluble agents have been employed, common examples of the latter being Paris green, Bordeaux mixture and the like, for the destruction of insects and fungi. The compositions containing soluble agents which have heretofore been employed are open to the objection that these materials are readily washed off the plant, by rains, dew and the like, since these agents readily dissolve in water. The compositions containing agents that are insoluble, or substantially so, also are washed off, to a large extent, from the surface of the plant, particularly during long continued wet spells, or during heavy rains. Thus the effectiveness of these agents becomes lost, whether the agents themselves be soluble or insoluble.

The object of the present invention is the treatment of plants with such compositions as contain ingredients capable of overcoming this objection, by becoming insoluble in water, which compositions are preferably composed of ingredients, all or a part of which are water-soluble, at the time of application to the plant.

It has long been known that potassium dichromate, sodium dichromate, and many other chromium compounds have the effect of hardening many animal and vegetable substances or producing products therewith, which are substantially insoluble in water, but which have more or less tenacity, especially when produced *in situ*. In accordance with the present invention I produce such a product, *in situ* upon the leaves and other portions of the plants treated, by virtue of the fact that I employ in the composition for treating the plants, a chromium compound such as above noted, together with a substance capable of uniting with said chromium compound, and producing, (particularly when acted upon by sunlight) a product which is substantially insoluble, but which adheres with considerable tenacity to the leaves, and other portions of the plants. These products produced by the action of dichromate upon animal or vegetable substances, have also the property of closely adhering to the surface upon which they are produced, and of being very cohesive, as well as tenacious. It is on account of these properties of the films or coatings produced by applying said materials, as well as the water-insoluble properties thereof, which enable these coatings when produced upon the surface of a plant, to withstand the action of rain and wind and to remain for a long time upon the surface of the plant. Coatings containing such products are sometimes more or less tough and leathery, and by virtue of these properties they behave in an entirely different manner from dry powders. Thus for example when a suspension of Paris green in water alone is sprayed upon a growing plant (as has been common practice for many years) after evaporation of the water, a light thin film or layer of Paris green is left upon the surface of the plant. This film or layer, however, is of such a physical character, that it is very quickly washed away by rain or blown away by wind. The coatings produced in accordance with the present process, however, being in some instances, somewhat tough and leathery, non-brittle and elastic, and resisting the action of heavy rains, are enabled by virtue of these properties to cling to the surfaces of the plant leaves, etc., for a very long time, thereby lengthening the time of usefulness of the plant-treating agent. The composition employed for treating the plant may contain any of the active agents above referred to, and I do not limit myself to the use of any particular agents for this purpose.

The term "coating" as used herein, does not necessarily mean a continuous coating, covering every part of the leaf, or other portion of the plant treated. I find that the leaves are able to "breathe" in the usual manner, which leads me to believe that the "coating" may consist of a large number of spots of the composition, each closely adhering to the leaf surface.

As an example of my process, I call attention to the spraying of plants with a composition which may consist of a solution containing a chromium compound and a substance capable of being rendered insoluble by said chromium compound when acted upon by light, particularly direct sunlight. Such a composition may contain a soluble insecticide, parasiticide or fungicide, in which case the entire spray mixture may be water-soluble, thereby overcoming one of the objections to many of the spraying compositions heretofore employed containing insoluble agents, which displayed a tendency to clog up the nozzles or other portions of the spraying apparatus. There are material advantages in the use of soluble agents in plant treating compositions, since it is not necessary to constantly stir or agitate such compositions, to keep the same uniform, which is necessary when using insoluble agents, to obtain a uniform treatment of the plants. The spraying composition might also contain insoluble insecticidal agents, for example those previously used, such as Paris green or Bordeau mixture.

As a specific example of my invention, the following is given, but it is to be clearly understood that the invention is by no means restricted to this specific example. 5 parts by weight of soda lye (crude caustic soda) are added to water (which water may or may not be sufficient to dissolve the soda), for example 5 parts of water. While hot 20 parts of arsenic trioxid ($As_2O_3$) are added to the solution, preferably while stirring or mixing. Preferably while continuing the stirring and also preferably while heating, 10 parts of sodium dichromate, or potassium dichromate are added to the solution and while continuing the stirring. This material upon cooling produces a dry mass easily reduced to powder. To this mass, with or without grinding are added 10 parts more of dichromate, and 15 parts of dextrin (which materials may be previously powdered) preferably in a dry condition, and the mixture may be then ground up together, and thoroughly mixed, to produce a fine powder, consisting of an intimate mixture of the ingredients. This preparation, at the time of use, is dissolved in water, about 1 ounce to 2 gallons of water being a preferred proportion, and this liquid (forming my preferred spray composition) is applied to the plants in the usual manner, for example, by spraying the entire plants, or by spraying such portions of the plants as are liable to be infested with insects or fungi, or which it is desired to treat. It is by no means necessary that the ingredients employed should be pure, ordinary crude lye or caustic soda, such as may be obtained in any grocery store in cans, crude arsenic as it comes from the smelter, crude potassium or sodium dichromate (bi-chromate) such as is commonly used in batteries, and commercial dextrin all being suitable for the purpose. It is obvious that should any of the ingredients employed contain any considerable amounts of insoluble or other objectionable impurities, they can be removed if desired in any suitable manner. With these proportions of ingredients, the powder is almost entirely water-soluble, hence no clogging of the spray nozzles or other parts of the spraying apparatus occurs, and agitation during use is unnecessary. No elaborate or expensive manufacturing process, and no elaborate apparatus is required. The arsenic becomes thoroughly neutralized and hence will not injure the foliage. It is obvious that in place of caustic soda, caustic potash may be employed, and in place of caustic soda and arsenic trioxid, other soluble or insoluble arsenical, or other insecticidal or fungicidal agent may be used.

When the material in solution is first exposed to sunlight, or other strong light, the color turns to a bright green, indicating a chemical change taking at least a portion of the dichromate being converted into a chromium salt. I believe this to be due to the fact that when a dichromate is converted into a salt of $Cr_2O_3$, the color changes from a reddish yellow to a dark green.

When the composition is applied to the plants, the action of light upon the same, particularly during drying is such as to convert the adhesive substance therein into a substantially insoluble product, which will not wash off the plants, even after several days of rain. On account of this fact, one spraying with my preferred composition will continue to exert its effect, for a long period of time, making frequent sprayings of the plants unnecessary.

In the description and claims, I have used the term "plant" in a generic sense, meaning to include thereby not only the ordinary herbaceous varieties of plants, but also trees, shrubs and the like. In many cases it may be desirable to treat the entire plant, that is to say the stems, leaves and perhaps also the blossoms, while in other instances it is preferable to treat a small part only of the plant, in order to save expense. The claims are intended to cover the treatment of plants, whether the entire plant or a portion thereof is treated.

It will be noted that in the specific example, the caustic soda and the arsenic trioxid are not present in the proportions theoretically necessary to thoroughly neutralize each other. There appears to be some reaction between the arsenic trioxid (as a reducing body) and the alkali metal dichromate (as an oxidizing body) aided by the action of light, whereby the dichromate is reduced to the condition of a chromium salt (hence the green color) while the alkali of the alkali dichromate goes over to help neutralize the arsenic. In this reaction the arsenious acid is oxidized to arsenic acid. The following reactions may take place, but I do not bind myself to any particular theory:

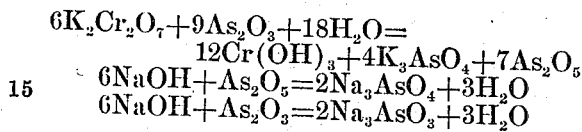

$$6K_2Cr_2O_7 + 9As_2O_3 + 18H_2O =$$
$$12Cr(OH)_3 + 4K_3AsO_4 + 7As_2O_5$$
$$6NaOH + As_2O_5 = 2Na_3AsO_4 + 3H_2O$$
$$6NaOH + As_2O_3 = 2Na_3AsO_3 + 3H_2O$$

The exact chemical composition of the spraying solution is quite immaterial, so far as the present invention is concerned, and these reactions are given merely as explanation of what may take place. The proportions given need not be followed exactly, so long as a substantially neutral solution (which will not injure the foliage or plant) be produced.

What I claim is:—

1. A process of treating a plant which comprises the application to the plant of a composition containing a plant treating agent, and also containing a water soluble substance which when subjected to the action of light, is converted into a substantially insoluble product, and allowing the same to be acted upon by light, whereby a coating containing a product substantially insoluble in water and also containing the plant treating agent, and retaining the same in close proximity to the plant tissue is produced, and whereby the said plant treating agent is protected against moisture.

2. A process which comprises spraying a plant with a composition containing an agent capable of destroying organisms detrimental to the plant, and also containing substances which are capable of reacting together under the influence of light, with the production of a substantially water-insoluble, flexible product, holding said agent closely adherent to the surface of the plant.

3. A process of treating plants which comprises the application to the plant of a liquid composition comprising an agent capable of destroying organisms detrimental to the plant, and containing a chromium compound and a soluble substance which is capable of being converted by said chromium compound into a substantially insoluble, leathery, flexible product, and thereafter allowing said chromium compound to react upon said substance, to produce a coating comprising said product, inclosing said agent and retaining the same in contact with the surface of the plant.

4. A process of treating plants which comprises the step of spraying the same with a solution containing an arsenical insecticidal agent, a dichromate and dextrin, and permitting the action of light thereupon.

5. A composition suitable for treating plants, which comprises a liquid vehicle containing a metal compound, and containing an organic substance capable of being converted by the action of light and said metal compound into a substantially insoluble product, and containing an agent capable of destroying organisms detrimental to the plant.

6. A composition for treating plants containing an arsenical agent capable of destroying organisms detrimental to the plant, and containing a salt of chromic acid, and containing a water soluble adhesive capable of reacting under the influence of light with said salt, to produce a water-insoluble compound.

7. A composition for treating plants containing an arsenical insecticidal agent, and dichromate and dextrin.

In testimony whereof I affix my signature.

CLARENCE W. EASTMAN.